UNITED STATES PATENT OFFICE.

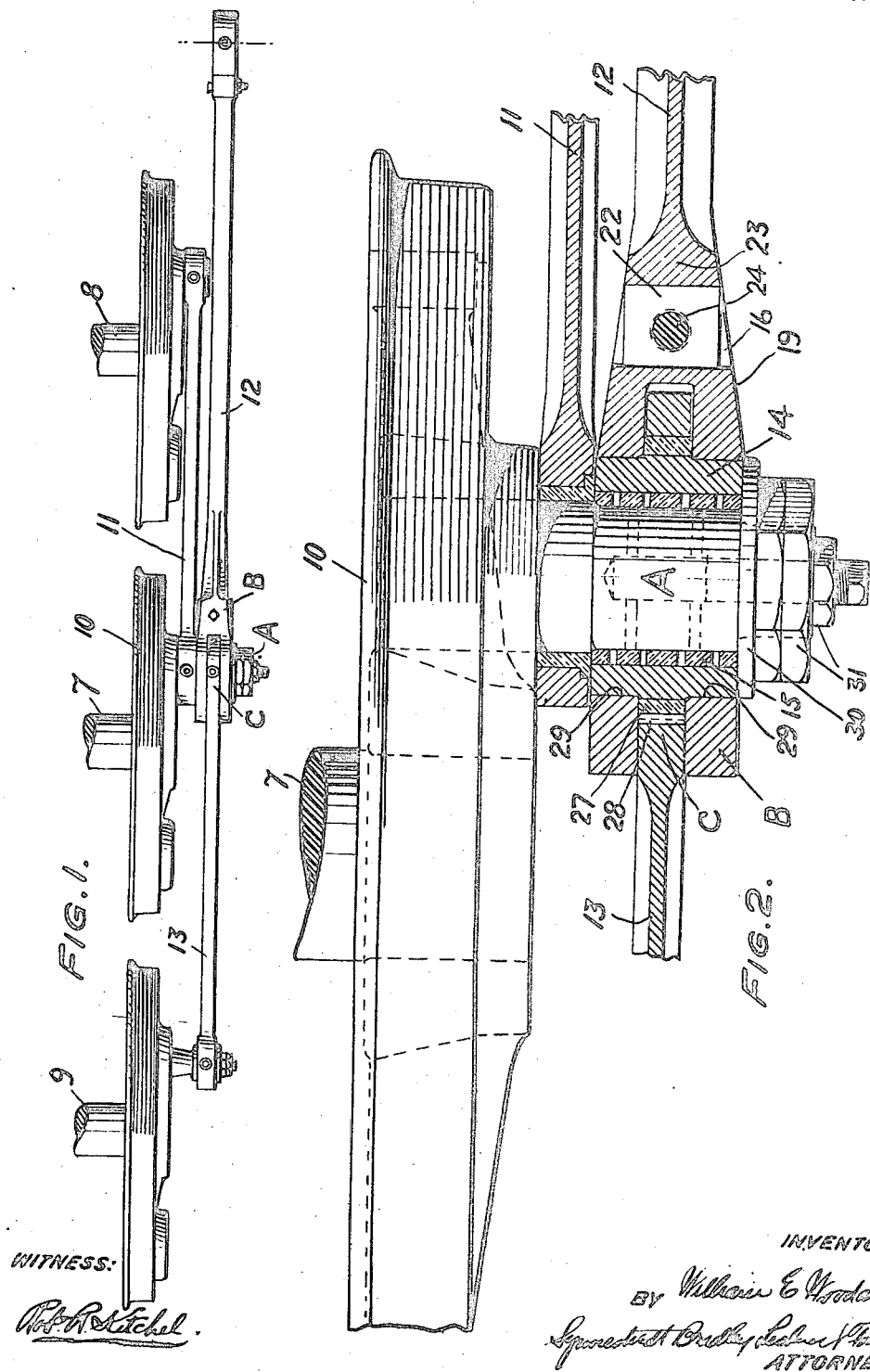

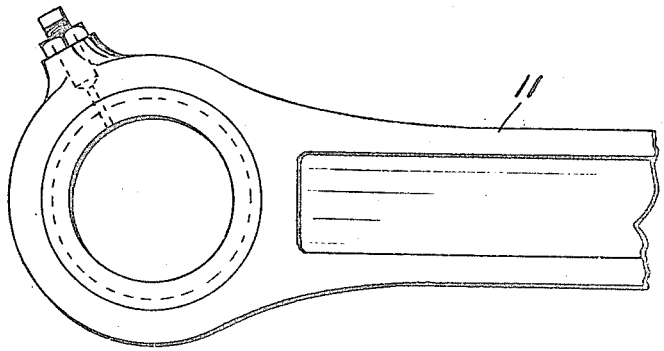
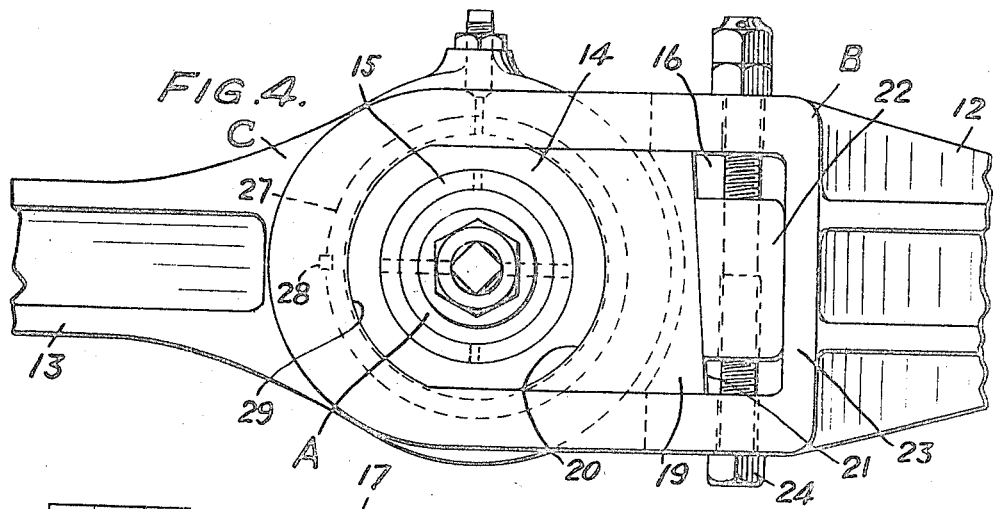
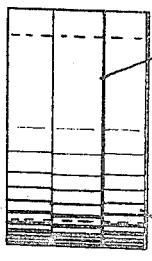
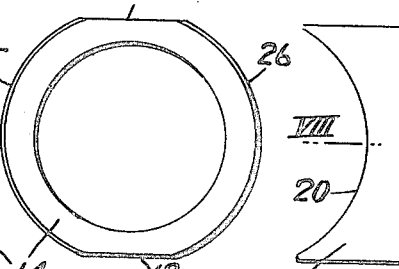
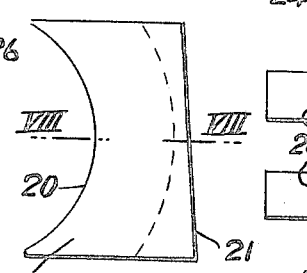
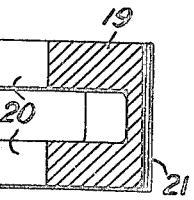

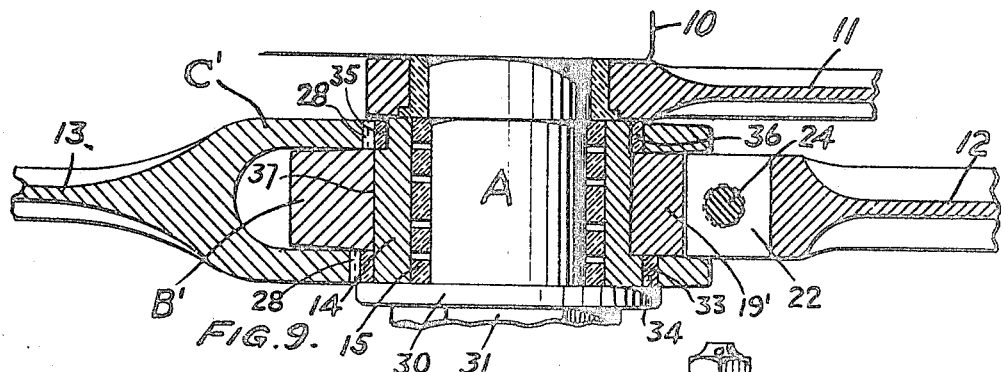

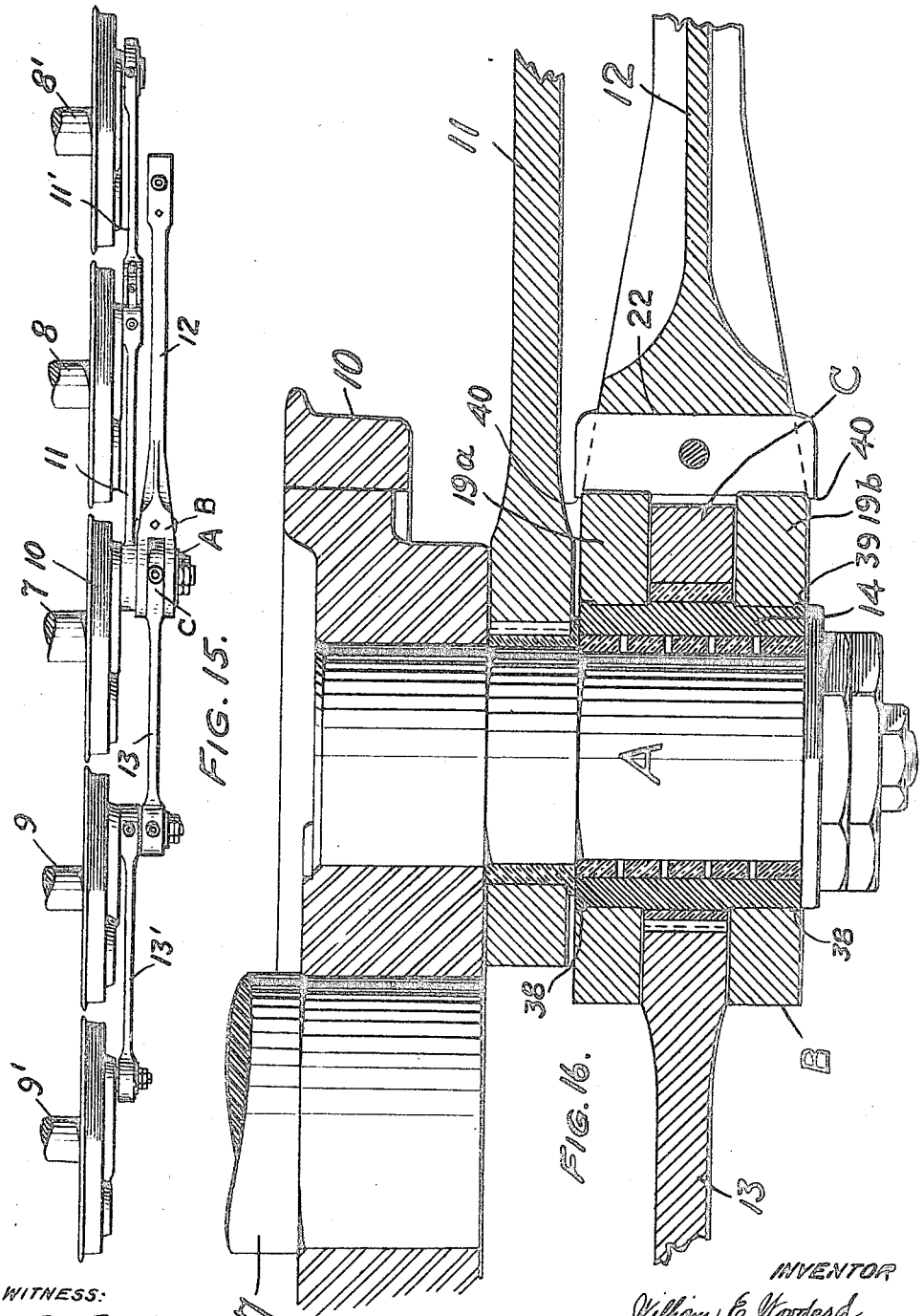

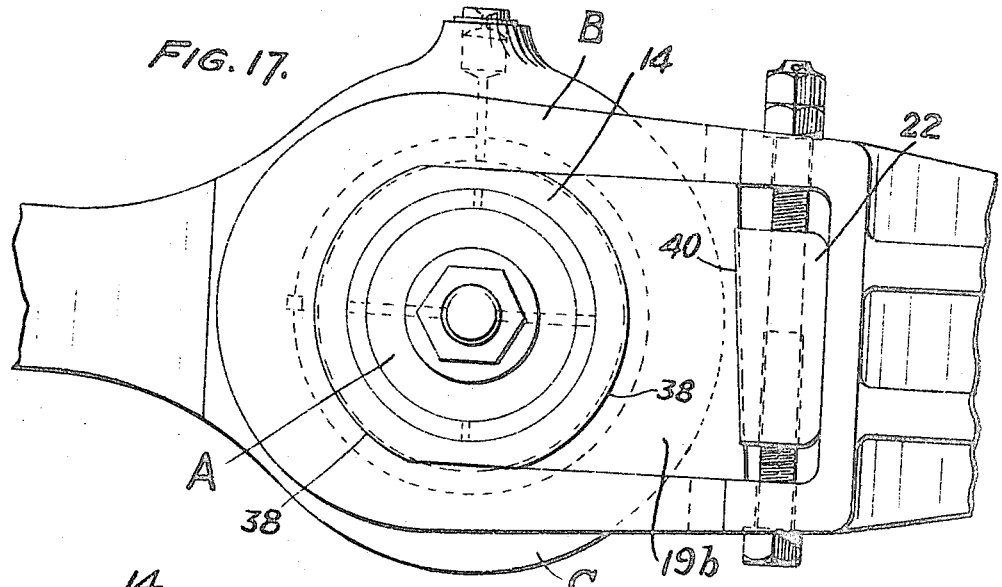
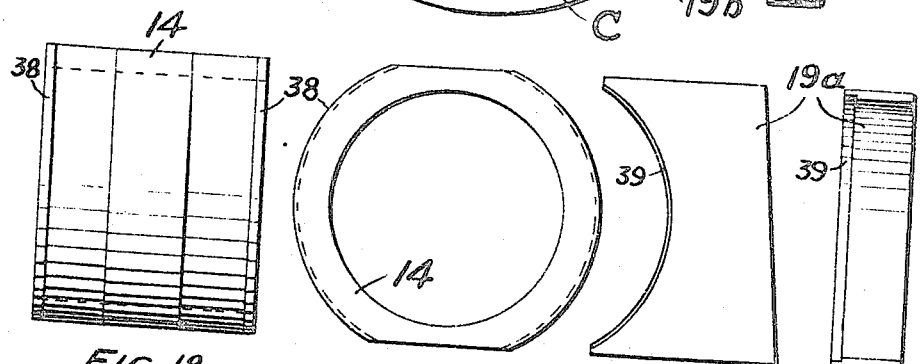
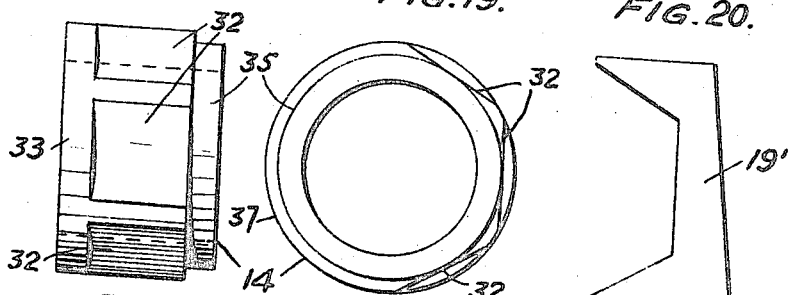

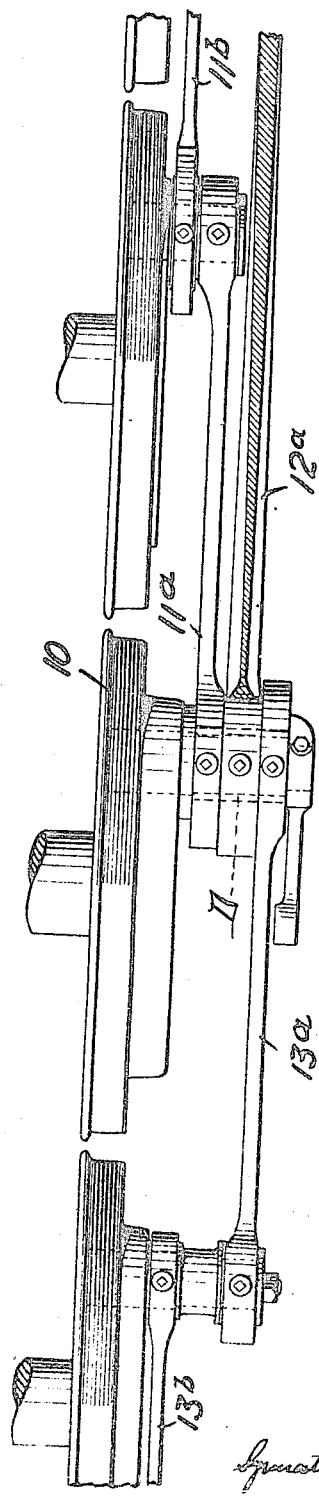

WILLIAM E. WOODARD, OF SCHENECTADY, NEW YORK.

ROD-DRIVE FOR LOCOMOTIVES.

1,253,451.   Specification of Letters Patent.   Patented Jan. 15, 1918.

Application filed April 14, 1917. Serial No. 161,968.

*To all whom it may concern:*

Be it known that I, WILLIAM E. WOODARD, of Schenectady, in the county of Schenectady and State of New York, have invented certain new and useful Improvements in Rod-Drives for Locomotives, of which the following is a specification.

This invention relates to a novel rod drive connection for locomotives for transmitting the operative power from the pistons, and it is particularly applicable to locomotives having three or more pairs of coupled driving wheels.

My invention has to do primarily with the general types of driving connections shown, for example, in the patent to Humble #391,148, issued October 16, 1888, and the patent to Kenyon #459,097, issued September 1, 1891, and others of a similar nature.

The general purpose of such constructions is to eliminate the bending moment transmitted through the coupling rods on the main pins; to decrease the transverse racking and strain of the locomotive; and to decrease the driving work performed by said pins, thereby reducing the wear on the bearings and the tendency to overheating.

In the patent to Kenyon above noted, it is sought to obtain the desired results by mounting the coupling rod B directly on the main connecting rod A, the bushing D, which extends beyond each side of the connecting rod to provide bearings for the fork or clevised end of the coupling rod B, being pressed into the eye or main crank pin end of the connecting rod, hydraulically or otherwise. It has also been proposed in locomotives having six coupled driving wheels or a greater number of driving wheels, to mount one and sometimes two coupling rods on the connecting rod, by the use of such a sleeve or bushing D pressed into the connecting rod eye. (Figure 22.) The chief difficulty inherent in this arrangement of mounting the coupling rod or coupling rods directly on the connecting rod, is that in the event of breakage of the connecting rod necessitating its removal, a spare bushing must be carried as a substitute for the bushing D in order to move the locomotive. There are also difficulties encountered in assembling or disassembling the parts of such a construction.

Certain of the difficulties inherent in the construction described are not met with in the construction of the Humble patent above mentioned, for assemblage is not quite so difficult. The construction is such as to necessitate the use of straps on either the connecting rod or the coupling rod. It is thus impossible to obtain the advantages inherent in making the rod heads integral with the body of the rod.

In accomplishing and obtaining the desired results and advantages, I propose to use a construction more closely resembling that of the Humble patent, but which overcomes some of the difficulties incident to the construction of that patent and obtains certain additional advantages. My improvements also overcome the difficulties encountered in the construction such as that shown in the Kenyon patent in which the coupling rod or rods is or are mounted directly on the connecting rod, and has additional advantages thereover.

I obtain the foregoing, together with such other objects and advantages as may hereinafter appear, by means of a construction, the preferred embodiments of which I have shown in the accompanying drawings, wherein—

Fig. 1 is a plan view of my improvements applied to a six coupled engine; Fig. 2 is a sectional view through one form of my improvement shown on an enlarged scale; Fig. 3 is a side elevation of part of a coupling rod; Fig. 4 is a side elevation of Fig. 2 with certain of the parts omitted; Figs. 5 and 6 are respectively an end and side elevation of one detail of the arrangement shown in Fig. 2; Fig. 7 is a side elevation of another detail of such construction; Fig. 8 is a section taken on the line VIII—VIII of Fig. 7; Fig. 9 is a section corresponding to Fig. 2 to illustrate a modification of my invention; Fig. 10 is a side elevation of the crank pin end of the main rod employed in the modification shown in Fig. 9 with various detailed parts in position; Fig. 11 is a side elevation of the crank pin end of the coupling rod utilized in the construction of Fig. 9; Figs. 12 and 13 are respectively an end and side elevation of a detail used in connection with the construction of Fig. 9; Fig. 14 is a side elevation of another detail utilized in such construction; Fig. 15 is a plan view of my invention as applied to a ten coupled engine; Fig. 16 is a section through the crank pin connections of still another modified form of construction; Fig. 17 is a side elevation of Fig. 16; Figs. 18 and 19 are respectively an end and side elevation of a detail of the construction of Fig. 15; Figs. 20 and 21 are respectively a side and end elevation of another detail employed in the construction of Fig. 15; and Fig. 22 is a view of one form of rod drive construction heretofore proposed.

Referring now to Fig. 1, which is a plan view of one side of the driving connections of a six coupled locomotive to which my invention has been applied, it will be seen that 7 is the main driving axle, 8 the forward driving axle, and 9 the rear driving axle. The main crank pin, indicated as a whole at A, is mounted in the wheel 10 of the main driving axle 7. The forwardly extending coupling rod 11, which drives the wheels of the front driving axle 8, is mounted in the usual manner on the main crank pin. The main driving rod 12 and the rearwardly extending coupling rod 13, which drives the wheels of the driving axle 9, are mounted on the main crank pin in a novel manner.

The main crank pin A is provided with a collar or sleeve 14, which collar is provided with a suitable bearing brass 15 either pressed in the sleeve or a slip brass. The crank pin head end B of the main driving rod 12, which head is preferably made integral with the driving rod, is bifurcated and is provided with an enlarged transverse opening 16 of a size permitting the main rod to be slipped over the collar 14. The collar 14 is provided with flatted surfaces 17 and 18 at the top and bottom, which surfaces engage the inner faces of the head B so that the collar will not rotate when the parts are all assembled. The main crank pin head end B of the driving rod is positioned with respect to the collar 14 so as to be concentric therewith, and thus concentric with the crank pin A, by means of the bifurcated block 19 (see Figs. 2, 7 and 8), which block is provided with curved faces 20 adapted to engage the periphery of the collar 14. The block 19 fits the opening 16 and is provided with a front inclined face 21. A wedge 22 is fitted into the opening 16 between the block 19 and the front wall 23 of the head B, the wedge 22 being operated by means of the bolt 24 passed through the head B, such bolt having threaded connection with the wedge 22.

The collar 14 is provided on its front and rear faces with projecting ribs or shoulders 25 and 26 concentric with the crank pin A. The main crank pin head end C of the coupling rod 13 is provided with a bearing brass 27 fitting on the shoulders 25 and 26, such bearing brass 27 being pressed in or keyed in position by means of the key 28.

The parts are assembled as follows; The coupling rod 11 is first slipped into position on the crank pin A; then the collar 14 with its bearing brass 15 is slipped onto the crank pin, after which the main rod 12 and the coupling rod 13, with the main crank pin head end C of the coupling rod in position in the bifurcated head B of the main connecting rod 12, are slipped in position over the collar 14, this being possible because of the enlarged opening 16 in the head B of the main rod. The main rod is now positioned with respect to the collar 14 by first inserting the block 19 and the wedge 22, after which the bolt 24 is tightened, drawing down the wedge 22 on the inclined face 21 of the block 19. Since the collar 14 is mounted on the crank pin A, the drawing down of the wedge 22 forces the main rod forwardly until the curved surfaces 29 at the rear of the head B engage the corresponding curved faces of the collar 14. At the same time the curved faces 20 of the block 19 are brought into engagement with the corresponding curved faces of the collar 14, as a result of which the crank pin head B of the connecting rod 12 is forced into position and held concentric with the main crank pin A. The washer 30, which engages the outer end of the collar 14 to position the same, and the usual nuts 31 are then positioned.

From inspection of Fig. 2 it will be seen that side play of the head B and block 19 with respect to the collar 14 is prevented by the shoulders 25 and 26, while substantial side play by the coupling rod 13 is prevented by the forks of the head B.

By the foregoing arrangement it will be seen that I have provided a push and pull bearing for the coupling rod 13, the thrusts of such coupling rod in turning the wheels of the rear axle 9 being transmitted to the collar 14, as a result of which the crank pin A is relieved of such thrusts, the only thrusts transmitted to such crank pin being those transmitted by the connecting rod in driving the wheels of the main driving axle 7 and those transmitted by the coupling rod 11 in driving the wheels of the front axle 8.

Attention is now directed to Figs. 9 to 14, inclusive. In the arrangement therein shown, I bifurcate the crank pin head C' of the coupling rod 13 and mount the main crank pin head B' of the connecting rod 12 between the forks of the coupling rod head, the heads of both coupling rod and connecting rod being mounted on a collar 14, which is provided with the bearing brass 15 and which is mounted on the crank pin A in the manner hereinbefore described. The collar 14 in this instance, however, instead of being flatted at the top and bottom is provided in its front face with three flat surfaces 32 adapted to fit into the block 19', corresponding to the block 19 previously described. From an inspection of Figs. 12 and 13, it will be seen that the flatted faces 32 on the collar 14 are not coextensive with the collar in width, in order to provide a suitable bearing surface 33 for the bearing brass 34 of the outside fork of the head C' of the coupling rod. At the inner end the collar 14 is turned down to provide a bearing surface 35 for the bearing brass 36 of the inner fork of the head C'. The rear face 37 of the collar 14 is rounded and is concentric with the crank pin A and the rear end of the head B' fits such curved surface 37 (see Figs. 9 and 10). The connecting rod head B' is positioned with respect to the collar 14 so as to be concentric with the main crank pin by wedge 22 and bolt 24, as described. The engagement of the surfaces 32 by the block 19' prevents the collar 14 from rotating. The forward coupling rod 11 is mounted in the same manner as the previous construction and a similar washer 30 and nuts 31 are also provided to hold the parts in position and to prevent side play.

In Figs. 15 to 21 inclusive, I have illustrated another modification of my invention, the same being shown as applied to a ten coupled locomotive. In this arrangement, 7 is the main driving axle, 8 and 8' the driving axles in advance thereof, and 9 and 9' the driving axles to the rear thereof; A is the main crank pin, 12 the connecting rod, 11 the coupling rod connecting the wheels of the driving axles 7 and 8; 11' the coupling rod connecting the wheels of driving axles 8 and 8'; 13 the coupling rod connecting the wheels of driving axles 7 and 9; and 13' the coupling rod connecting the wheels of driving axles 9 and 9'. The coupling rod 11 is mounted on the main crank pin A in the manner previously described, and coupling rod 11' is connected to coupling rod 11 in any preferred manner.

The construction is in general the same as that shown in Fig. 2 but in this instance, the collar 14 is provided with the lip 38 at each end adapted to fit into corresponding grooves formed in the forks of the head B of the connecting rod 12. Instead of using one block 19, two blocks 19ª and 19ᵇ are provided, the inner face of each block adjacent the outside edge thereof having the groove 39 adapted to receive the lip 38 of the collar 14. By this arrangement of interfitting lips and grooves on the forks of the head B and on the blocks 19ª and 19ᵇ, spreading of the forks of the head B and of the blocks 19ª and 19ᵇ is prevented. As an additional means for preventing spreading of the blocks 19ª and 19ᵇ the wedge 22 is provided with the lip 40 at each end adapted to engage the outside faces of the blocks.

In all three of the constructions described, the work done by the crank pins is reduced and they are, to a large extent, relieved from bending moments. This makes it possible to reduce the size of the crank pins thus cutting down the rotating weights. There is less wear on the bearings and the liability of overheating is reduced. The connections are compact so that the crank pins can be made short thus decreasing the lever arms through which the piston effort is exerted, thus reducing the transverse racking of the locomotive, and keeping down the distance between axes of the cylinders. The connections therefore have all of the advantages of the prior constructions described while certain of the disadvantages thereof are eliminated. Thus, for example, the difficulty of assembling noted in connection with the Kenyon patent is overcome, nor is it necessary to provide a spare bearing as a substitute for the bushing D in the event of breakage of the connecting rod.

Again, with my improvements I am enabled to use solid end constructions on both connecting and coupling rods. This is a very important advantage for the reason that if a strap construction were to be used on modern heavy power locomotives, the size and weight of the straps and bolts would have to be increased to a prohibitive point in order to withstand the thrusts transmitted. The solid end construction of coupling rods is also mechanically superior. It will be seen therefore that I have made it possible to adapt a drive connection of the general type shown in the Humble patent to modern conditions.

The advantages incident to my improvement as applied to ten coupled locomotives, or locomotives such as have two or more driving wheels forward of the main driving wheel, will be clear from a comparison of the same with a construction such as shown in Fig. 22, in which the coupling rods 11ª and 13ª, respectively extending forwardly and rearwardly of the main driving wheel 10, are mounted on a sleeve pressed into the eye of the connecting rod 12ª, one on the inside thereof, and the other on the outside thereof.

It has been found in locomotive practice that it is desirable to keep the main pin bearing as short as is consistent with cool running, because of the fact that the forward end of the connecting rod is coupled to the cross head, which is carried by the guides in turn supported from the spring supported mass of the locomotive. This mass has a very considerable motion, and oftentimes a rolling motion, in reference to the horizontal center line of the main pin, thus producing a twisting motion of the connecting rod in reference to the main pin. It is evident for cool running therefore that the length of the main pin bearing should be kept as short as possible in order to reduce to a minimum the influence of the motion referred to.

For the above reason it is apparent that it is desirable to keep the main pin bearing as short as possible, but this imposes as a necessity in the type of construction shown in Fig. 22, for example, the keeping of the center line of the forwardly and the rearwardly leading coupling rods as close as possible to the connecting rod center line. In all engines of the class under discussion the forward driving wheels are directly behind the guides and cross heads, and therefore require a certain amount of mechanical clearance inside of these parts to allow for proper rotation.

In the construction shown in Fig. 22 an additional factor is to be considered, namely, that the thrusts carried by the coupling rods 11$^a$ and 13$^a$ must balance each other so as to produce no bending moment upon the connecting rod, as a result of which the relation of the center line of coupling rod 11$^a$ with respect to the center line of connecting rod 12$^a$ determines the relation of the center line of coupling rod 13$^a$ with respect to the center line of connecting rod 12$^a$. Therefore it follows that if the overall length of the crank pin and crank pin bearing is to be kept within practical limits, the coupling rod 11$^a$ must be brought so close to the connecting rod that it is impossible to arrange the coupling rod 11$^b$ for Number 1 driver in the same vertical plane as coupling rod 11$^a$. It is necessary therefore in this construction to place the coupling rod 11$^b$ inside of coupling rod 11$^a$ in order to obtain the mechanical clearance necessary for rotation of the forward driving wheels directly behind the guides and cross heads. This arrangement of the forward coupling rod inside coupling rod 11$^a$ involves certain mechanical difficulties, such as reducing the distance between the driving wheel hubs on Number 2 driver far below that which is ordinarily used, and also introducing a large number of extra parts and increasing the weight of the rods.

By my improvement, however, all of these disadvantages are avoided because I am enabled to arrange all of the coupling rods leading forward from the main driver at any convenient distance inside the center line of the connecting rod, irrespective of the center line of the coupling rod, which leads from the main driver backward, and I am thus enabled to lay out the coupling rods leading forward from the main wheel in one vertical plane which in locomotive construction is of great advantage, besides reducing the number of parts involved and also the total revolving weights.

A corresponding advantage is obtained at the crank pin of the wheel directly following the main wheel, for while in the construction of Fig. 22 it is necessary to add a spacing piece or bushing between the coupling rod 13$^a$ and the coupling rod 13$^b$, it is unnecessary to employ this spacing piece or bushing in my improvement.

Another disadvantage incident to the construction shown in Fig. 22 is that while theoretically the thrusts carried by the forwardly and rearwardly leading coupling rods balance each other so as to produce no bending moment upon the connecting rod, in practice it will be impossible to obtain this condition, for the reason that the amount of thrusts carried by such coupling rods depends upon the relative adhesion of the wheels driven by the rods, and such adhesion varies because the weights at the rails vary considerably and because the conditions of the rails, the hardness of the tires, sanding of the rails, and other factors make it impossible to have the same amount of adhesion. This is particularly true with respect to sanding, as a result of which the forward drivers will have a very much higher adhesion, and consequently the thrusts imposed upon the coupling rod leading forwardly will be far greater than on the coupling rod leading rearwardly from the main pin, thus throwing a very heavy side bending strain upon the main or connecting rod.

Another important factor is that the amount of thrusts carried by each of the rods depends upon the accuracy of the fitting, and if the fittings of the bearings in the rearwardly leading coupling rod are loose in comparison with the corresponding bearings in the forwardly leading coupling rod, it is evident that at certain points of revolution, the rod leading forwardly will take almost all of the thrust, this condition again imposing a very serious side bending stress on the main rod. The accuracy of fitting necessary in the construction of Fig. 22 therefore is not encountered to the same degree in my improved arrangement, neither will there be the consequent unequal wear of the bearings. This follows from the fact that by my improved arrangement the rearwardly leading coupling rod is in the same vertical plane as the connecting rod, and therefore any inequalities in the division of thrusts between this rod and the forwardly leading coupling rod throws no bending stress upon the main rod.

There is still another factor which produces a distinct disadvantage in connection with the construction shown in Fig. 22, and that is the distance which the forwardly and the rearwardly leading coupling rods must be placed from the plane of the counterbalance in the various wheels. It is one of the recognized principles of counterbalancing locomotives that the plane of the counterbalance weight in the driving wheel shall be placed as nearly as possible in the plane of the revolving weight (in this case coupling rods) which it balances. It will be at once evident from inspection of Fig. 22 that the plane of the counter weights of Number 2 and Number 4 wheels (that is the second and fourth drivers counting from the front) must for mechanical reasons of clearance be placed very considerably farther away from the rods which they counterbalance than is the case in my improvement as applied to ten coupled locomotives. The effect of placing revolving weights at some distance away from the plane of the corresponding counterweight in the wheel is to produce a couple due to the centrifugal forces in the revolving part and its counterweight acting in different planes.

Again, another advantage incident to my improvement is that I am enabled to use a shorter length of main pin which brings the rod driving the valve motion nearer the center line of the connecting rod, thus reducing or avoiding offsets in the valve motion parts, in addition to cutting down rotating weights.

I claim:

1. The combination with a locomotive having a main crank pin, of a bearing sleeve mounted on said crank pin, a coupling rod having an eye adapted to be slipped over said sleeve, a main connecting rod having an eye adapted to be slipped over said sleeve, and means for preventing the sleeve from rotating.

2. The combination with a locomotive having a main crank pin, of a sleeve mounted on said crank pin, a solid end coupling rod and a solid end main rod, mounted on said sleeve for free removal therefrom, one of said rods having means preventing rotation of the sleeve with respect thereto, and the other rod having a bearing on said sleeve.

3. The combination with a locomotive having a main crank pin, of a sleeve mounted on said crank pin and having a flatted surface, a main rod and a coupling rod, one of said rods having a flat surface engaging the flatted surface of the sleeve to prevent rotation of the sleeve with respect to said rod, and the other rod having a bearing on said sleeve.

4. The combination with a locomotive having a main crank pin, of a sleeve mounted on said crank pin and having a flatted portion in its periphery, a main connecting rod having an eye fitting said sleeve and provided with a flatted portion engaging the flatted portion of the sleeve to prevent rotation of the sleeve with respect to the connecting rod, and a coupling rod having a bearing on said sleeve.

5. The combination with a locomotive having a main crank pin, of a sleeve mounted on said crank pin, a solid end connecting rod and a solid end coupling rod, adapted to be slipped over said sleeve, one of which is provided with means for preventing rotation of the sleeve with respect thereto, and the other of which has a bearing on said sleeve, one of said rods being forked and the other rod being mounted on the sleeve between the forks of said first rod.

6. The combination with a locomotive having a main crank pin, of a sleeve mounted on said crank pin, a main rod and a connecting rod, one of said rods having an eye having a bearing on said sleeve and the other rod having an eye fitting said sleeve but elongated, a block mounted in said elongated eye and fitting said sleeve, and means for wedging said block to position the rod having the elongated eye with respect to said sleeve.

7. The combination with a locomotive having a main crank pin, of a sleeve mounted on said crank pin, and a connecting rod and a coupling rod on said sleeve, one of said rods being forked and the other being mounted between said forks, and means for preventing spreading of the forked rod.

8. The combination with a locomotive having a main crank pin, of a sleeve mounted on said crank pin, and a connecting rod and a coupling rod on said sleeve, one of said rods being forked and the other being mounted between said forks, and means on the sleeve for preventing spreading of the forked rod.

9. The combination with a locomotive having a main crank pin, of a sleeve mounted on said crank pin and having its periphery concentric with the crank pin, of a connecting rod and a coupling rod, one of which has a bearing on said sleeve and the other of which has a surface concentric with the sleeve, said last rod being provided with a block concentric with said sleeve and a wedge adapted to engage said block and force it into engagement with the sleeve to position the rod concentrically with the sleeve.

10. The combination with a locomotive having a main crank pin, of a sleeve mounted on said crank pin, a connecting rod member and a coupling rod member, each having an eye adapted to be slipped over said sleeve, and means for positioning one of said rod members with respect to the sleeve after the rod has been slipped over the sleeve, the other rod member having a bearing on said sleeve.

11. The combination with a locomotive having a main crank pin, of a sleeve mounted on said crank pin, a connecting rod member and a coupling rod member, one of said rod members having a bearing on the sleeve, and the other being non-rotative with respect to the sleeve, together with means for positioning said other member concentrically with the sleeve after the rod has been slipped over the sleeve.

12. The combination with a locomotive having a main crank pin and a plurality of coupled driving wheels in advance of the main driver carrying the main crank pin, of a connecting rod coupled to said main pin, a rearwardly extending coupling rod arranged in substantially the same vertical plane as the connecting rod, and coupling rods for the driving wheels forwardly of the main driver mounted in substantially the same vertical plane with reference to each other.

13. The combination with a locomotive having a main crank pin and a plurality of coupled driving wheels in advance of the main driver carrying the main crank pin, of a connecting rod coupled to said main pin, a rearwardly extending coupling rod arranged in substantially the same vertical plane as the connecting rod, and coupling rods for the driving wheels forwardly of the main driver mounted on the inside of the connecting rod and in substantially the same vertical plane with reference to each other.

14. The combination with a locomotive having a main crank pin and a plurality of coupled driving wheels in advance of the main driver carrying the main crank pin, of a connecting rod coupled to said main pin, a rearwardly extending coupling rod arranged in substantially the same vertical plane as the connecting rod and having a push and pull connection therewith, and coupling rods for the driving wheels forwardly of the main driver mounted in substantially the same vertical plane with reference to each other.

15. The combination with a locomotive having a main crank pin, of a sleeve mounted on said crank pin, providing a push and pull bearing for the rods, a pair of rod members adapted to be slipped over said sleeve, and adjustable means maintaining the sleeve and a rod member concentric.

16. The combination with a locomotive having a main crank pin, of a sleeve mounted on said crank pin, providing a push and pull bearing for the rods, a rod member adapted to be slipped over said sleeve, and means for tightening the rod on the sleeve after assemblage.

17. The combination with a locomotive having a main crank pin, of a sleeve mounted on said crank pin, providing a push and pull bearing for the rods, a rod member adapted to be slipped over said sleeve, and means providing a rigid non-rotative but freely detachable connection between the sleeve and the rod.

In testimony whereof, I have hereunto signed my name.

WILLIAM E. WOODARD.